Nov. 27, 1934.   J H. HUNT   1,982,106
VEHICLE WHEEL
Filed April 23, 1932
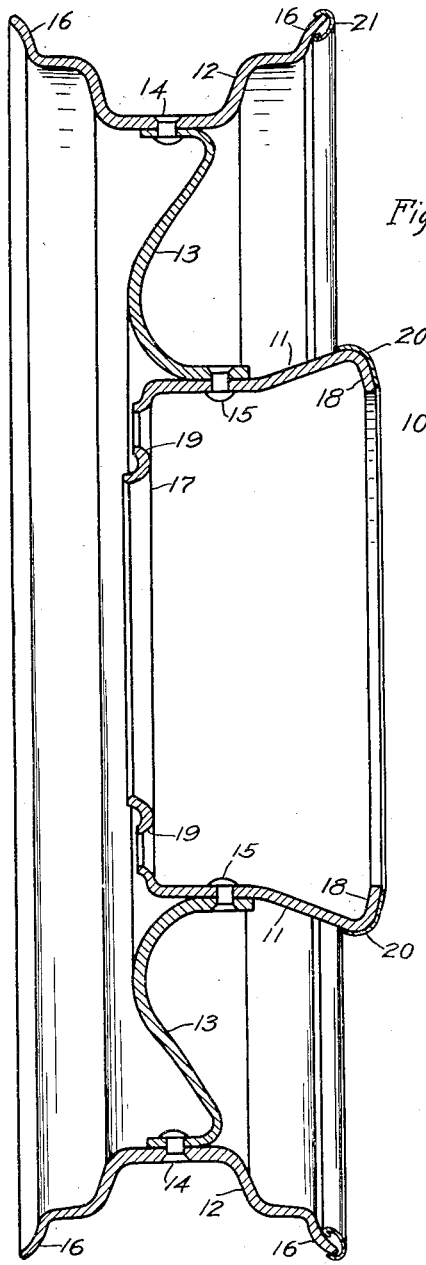
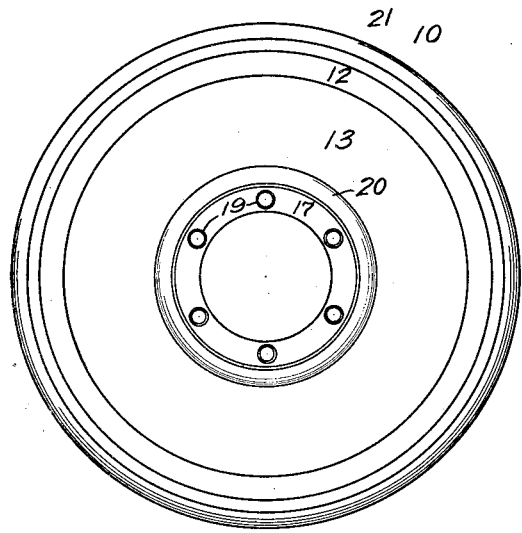
INVENTOR.
J Harold Hunt.
BY Carroll R Taber
HIS ATTORNEY.

Patented Nov. 27, 1934

1,982,106

UNITED STATES PATENT OFFICE 1,982,106

VEHICLE WHEEL

J Harold Hunt, Lansing, Mich., assignor to Motor Wheel Corporation, Lansing, Mich., a corporation of Michigan Application April 23, 1932, Serial No. 607,090

9 Claims. (Cl. 41—10)

This invention relates to vehicle wheels and more particularly to vehicle wheels including as a part thereof a decorative trim ring removably secured thereto. The principal object of this invention is the provision of a decorative trim ring adapted to be removably secured to certain portions of a vehicle wheel by means of its complementary and resilient engagement therewith. This object is attained by forming a continuous metallic ring of a predetermined cross sectional configuration and diameter, whereby the same may be pressed into engagement with an annular portion of the wheel. The ring is preferably formed of relatively light metal so that it may be distorted sufficiently to permit it to engage an annular surface having a diameter substantially equal to that of the ring.

Various types of decorative trims and trim rings have been used heretofore in combination with vehicle wheels. Where rings have been used they have always been non-continuous and have necessitated the use of securing means of some kind to fasten the ring to the wheel. The securing means add materially to the cost of the combination and frequently become loosened sufficiently to permit the ring to become separated from the wheel sufficiently to rattle, or, in some cases, to fall away from the wheel completely. The present invention eliminates these several defects in the prior art structures.

A preferred embodiment of the invention is illustrated in the accompanying drawing in which:

Fig. I is a cross section of a vehicle wheel having a decorative trim ring secured to one edge of the rim and a similar ring secured to the edge of the hub shell;

Fig. II is a side view of the wheel shown in Fig. I.

The vehicle wheel 10 embodying the present invention comprises a hub member 11 operatively secured to a rim section 12 by means of the disc 13. The disc 13 is preferably secured to the rim 12 and the hub shell 11 by means of the rivets 14 and 15. The rim 12 is of the so-called drop center type and has outwardly extending edges 16 at the opposite sides thereof. The hub shell 11 is of substantially cylindrical formation and is provided with an inturned flange 17 at one edge thereof and an inturned flange 18 at the other edge. The inturned flange 17 is provided with suitable openings 19 whereby a conventional hub and drum assembly not shown, may be secured to the hub shell 11 by means of any suitable securing studs not shown.

The inturned flange 18 and the edge 16 of the rim 12 on the corresponding side of the wheel 10 in the conventional wheel normally present a more or less unfinished appearance. This invention provides decorative trim rings 20 and 21 to cover these parts and thereby enhance the appearance of the wheel. The rings 20 and 21 are substantially identical with the exception that their cross sectional configuration is varied to correspond with the respective parts to which they are secured.

The rings 20 and 21 are formed from light, resilient metal and are made continuous. They are of suitable cross sectional configuration so that when in position they will snugly engage the parts to which they are secured. The rings are installed by distorting or bending the edges thereof sufficiently to permit them to be seated upon the respective parts to which they are secured. Once installed, the rings are held in position by reason of their resilient and complementary engagement with the respective portions of the wheel. They may be readily removed in substantially the same manner as they are installed, that is, by distorting or bending the edges sufficiently to permit the release of the ring from that portion of the wheel to which it is secured.

It is to be noted that the ring 21 is preferably circular or elliptical in cross section and formed with a continuous opening or aperture along one side thereof. Thus when the ring is properly flexed, or in other words, the diameter of the ring is changed, the opening will be in a position to receive that part of the rim to which the ring is to be connected. If desired, one edge of the material forming the ring may be turned inwardly as shown in order to provide a reinforcement for the ring.

Because of the fact that the rings are made continuous and are secured to the wheel by reason of their complementary and resilient engagement therewith, all objectionable noise and rattles are eliminated which frequently exist when non-continuous decorative rings are secured to vehicle wheels by conventional securing means. Likewise, the danger of the ring becoming separated from the wheel is eliminated in the present invention by reason of the novel method of securing these parts together.

While only the preferred forms of the invention have been shown and described, it should be understood that the invention is not limited thereto but is coextensive with the scope of the appended claims.

I claim:—

1. The combination with a vehicle wheel having a continuous annular edge portion of an ornamental trim therefor comprising a metal ring having continuous edges adapted to be removably secured to the said annular edge portion by effecting a change in the diameter of the ring whereby to cover the portion, the maximum diameter of the said annular edge portion being greater than the diameter of the edges of the ring and substantially the same as the diameter of an intermediate portion of the ring.

2. The combination with a vehicle wheel having a radially extending rim flange of an ornamental trim therefor comprising a continuous metal ring adapted to be removably secured to the outer extremity of said flange by effecting a change in the diameter of the ring whereby to cover the flange, the maximum diameter of said rim flange being greater than the diameter of the edges of said ring and substantially the same as the diameter of an intermediate portion of the ring.

3. The combination with a vehicle wheel including a hub shell having a continuous annular edge portion of an ornamental trim therefor comprising a metal ring having continuous edges and adapted to be removably secured to said edge portion by effecting a change in the diameter of the ring whereby to cover the portion, the maximum diameter of said edge portion being greater than the diameter of the edges of the ring and substantially the same as the diameter of an intermediate portion of the ring.

4. A detachable ornamental trim device comprised of resilient material formed into a hollow ring with a narrow opening provided along one side adapted to receive an annular portion of a vehicle wheel in a manner to allow the ring to resiliently engage said portion.

5. An ornamental trim as set forth in claim 4, in which the edges of the material forming the ring are forced toward each other to engage the annular portion when said ring is placed under tension by normally engaging said portion.

6. An ornamental trim as set forth in claim 4, in which one of the edges of the material forming the ring is turned inwardly to provide a reinforcement therefor.

7. An ornamental trim as set forth in claim 4, in which means are formed inwardly of the ring for reinforcing it.

8. An ornamental trim adapted to detachably engage an annular portion of a wheel rim, said trim being comprised of a flexible material formed into a hollow ring substantially elliptical in cross section, a continuous opening formed along one side of said ring of a character to receive the said annular portion of said wheel in a manner whereby the edges of the material forming the ring are adapted to resiliently engage said portion, and means formed adjacent said opening and extending to the hollow part of said ring providing a reinforcement therefor.

9. An ornamental trim for the edge of a wheel comprising a continuous flexible hollow ring having a continuous opening provided along one side thereof, said ring when sufficiently flexed being adapted to place said opening in a position to receive the edge of said rim and when released being adapted to spring into place and attach itself to said edge.

J HAROLD HUNT.